(12) United States Patent
Deboard et al.

(10) Patent No.: US 11,820,140 B2
(45) Date of Patent: Nov. 21, 2023

(54) DISPENSE MODES FOR MULTI-MODE CAPABLE DEVICE

(71) Applicant: Funai Electric Co., Ltd., Osaka (JP)

(72) Inventors: Bruce A Deboard, Lexington, KY (US); Michael A. Marra, III, Lexington, KY (US)

(73) Assignee: FUNAI ELECTRIC CO., LTD

( * ) Notice: Subject to any disclaimer, the term of this patent is extended or adjusted under 35 U.S.C. 154(b) by 46 days.

(21) Appl. No.: 17/699,280

(22) Filed: Mar. 21, 2022

(65) Prior Publication Data

US 2023/0311496 A1    Oct. 5, 2023

(51) Int. Cl.
   *B41J 2/045*    (2006.01)

(52) U.S. Cl.
   CPC ......... *B41J 2/04593* (2013.01); *B41J 2/0456* (2013.01); *B41J 2/04535* (2013.01); *B41J 2/04595* (2013.01)

(58) Field of Classification Search
   CPC .. B41J 2/04593; B41J 2/04535; B41J 2/0456; B41J 2/04595
   See application file for complete search history.

(56) References Cited

U.S. PATENT DOCUMENTS

| | | | |
|---|---|---|---|
| 5,649,576 A | 7/1997 | Kirk et al. | |
| 5,807,522 A | 9/1998 | Brown et al. | |
| 11,090,938 B1 | 8/2021 | DeBoard et al. | |
| 2005/0285890 A1* | 12/2005 | Marra, III | B41J 2/2056 347/15 |
| 2020/0215531 A1* | 7/2020 | Deboard | G01N 35/109 |
| 2020/0215532 A1 | 7/2020 | DeBoard et al. | |
| 2020/0217764 A1* | 7/2020 | Deboard | G01N 35/109 |
| 2021/0096079 A1 | 4/2021 | Barcelo et al. | |

* cited by examiner

Primary Examiner — Scott A Richmond
(74) Attorney, Agent, or Firm — Luedeka Neely Group, PC

(57) ABSTRACT

A system and method for ejecting one or more fluids from a digital dispense device. The method includes selecting a) fixed target areas and total fluid volumes for the target areas of the substrate; b) a predetermined droplet volume for the target areas; c) calculating a required number of droplets for the target areas; d) determining a maximum number of droplets per pixel based on the target areas; e) calculating a number of droplets per pass of an ejection head over the target areas; f) modifying one or more dimension of the target areas to create modified target areas; g) selecting and centering the modified spot size target areas in the target areas; and h) depositing fluids in the modified target areas while scanning the ejection head over the modified target areas.

20 Claims, 8 Drawing Sheets

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 50 | 50 | 50 | 50 | 50 | 0 | 0 |
| 0 | 0 | 50 | 50 | 50 | 50 | 50 | 0 | 0 |
| 0 | 0 | 50 | 50 | 50 | 50 | 50 | 0 | 0 |
| 0 | 0 | 50 | 50 | 50 | 50 | 50 | 0 | 0 |
| 0 | 0 | 50 | 50 | 50 | 50 | 50 | 0 | 0 |
| 0 | 0 | 50 | 50 | 50 | 50 | 50 | 0 | 0 |
| 0 | 0 | 50 | 50 | 50 | 50 | 50 | 0 | 0 |
| 0 | 0 | 50 | 50 | 50 | 50 | 50 | 0 | 0 |
| 0 | 0 | 50 | 50 | 50 | 50 | 50 | 0 | 0 |
| 0 | 0 | 50 | 50 | 50 | 50 | 50 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 5

DISPENSE MODES FOR MULTI-MODE CAPABLE DEVICE

TECHNICAL FIELD

The disclosure is directed to methods that are used to accurately dispense one or more fluids onto or into precise areas of a substrate for performing analysis of samples confined to the precise areas of the substrate or for building up layers of material in predetermined areas on the substrate.

BACKGROUND AND SUMMARY

A device such as an inkjet device, can dispense very small droplets of ink, usually measured in picoliters (pL) onto a substrate. For inkjet printing applications, the volume of ink that is deposited is a relatively low amount, and the volume is not as important as other factors such as color matching and print quality. The number of droplets is not specified or controlled by the user and thus the user has no ability to specify the dispensing of more ink droplets or fewer ink droplets than required for a specific printing application. A typical inkjet printer is limited to the deposition of about 2 to about 3 $\mu L/cm^2$.

However, for other applications that require accurate amounts of liquid to be dispensed onto or into a medium, fluid volume may be an extremely important and/or critical factor. For some application, it may be advantageous to specify that a volume of fluid is deposited into or over a specific area. An example may be the dispensing of a single drop of fluid containing a single cell into a well of a well-plate. Another example may be dispensing a large number of fluid droplets into a small areas such as filling each of 384 wells in a well-plate. Accordingly, the density of fluid deposited into the wells of a well-plate may require the dispensing of more than 250 $\mu L/cm^2$ of fluid. Likewise, depositing fluid onto a glass slide for analyzing a sample on the glass slide requires that a closely controlled amount of fluid is deposited over a specific area of the glass slide.

In the medical field, in particular, there is a need for automated sample preparation and analysis. The analysis may be colorimetric analysis or require the staining of samples to better observe the samples under a microscope. Such analysis may include drug sample analysis, blood sample analysis and the like. In the analysis of blood, for example, blood is analyzed to provide a number of different factors that are used to determine the health of an individual. When there are a large number of patients that require blood sample analysis, the procedures may be extremely time consuming. Also, there is a need for accurate preparation of the samples so that the results can be relied on. There are many other situations that require sample analysis in the medical field and in other fields that can benefit from the use of analytical instruments that provide accurate and reproduceable results, such as micro-titration of multiple samples.

Well plates, slides and other substrates are used for many experiments and laboratory procedures. The process of filling the wells or spotting slides is often performed manually or using expensive lab equipment. In some cases, the wells are filled with hand operated pipettes. In other cases, high-end automated devices based on pipette technology are used to fill the well plates. Such automated devices accommodate an open well dispense head only. The open well dispense head is a dispense head where a small amount of fluid must be deposited into an opening in the dispense head before use. The fluid is typically deposited manually using a pipette or similar means. The dispense head is held stationary while moving the microplate in both X and Y directions. These high end devices are extremely expensive.

In the areas of micro-circuit manufacture, fluids are required to be dispensed in precise locations to provide circuit devices on a substrate. The volume of fluid dispensed per unit area is typically much greater than can be provided by conventional ink jet printing technology. In some cases, different fluids are combined together on the substrate to provide a chemical or physical change to the fluids so that the resulting material performs a desired circuit function.

Other areas of micro-manufacturing may also require the precise deposit of fluids into or onto a substrate. There is thus the need for a method and device that can be used to dispense a predetermine volume of in one or more predetermined fixed areas of a substrate.

Conventional methods for depositing fluids include spreading the fluid evenly over a defined area while scanning an ejection head over the defined area. While the defined area can be any shape, once the size of the area is determined, the area is fixed for the particular application and cannot vary. FIG. 1 graphically illustrates the forgoing method. In column A, a predetermined area is provided, such as a square 10A, a circle 12A, a star 14A or any other shape. Next, as shown by 10B, 12B and 14B, the area is filled with a pattern of fluid droplets that provides the desired volume divided by the number of times an ejection head passes over the area. Finally, as shown in column C, the fluid is dispensed in each of the areas 10C, 12C and 14C N number of times to provide the desired total volume to be dispensed in the defined area.

Another method for depositing fluids involves moving the ejection head to a desired location or moving the medium under the ejection head to provide the desired location for deposition. Once the desired location is obtained, a predetermined volume of fluid is dispensed to the desired location. According to this method, the shape of the desired location is fixed and cannot be modified except by increasing the amount of fluid dispensed to the desired location. FIG. 2 graphically illustrates the foregoing method. In FIG. 2, two columns of nozzles are used to dispense fluid as the ejection head and/or substrate are held in a static position. Moving from 16A to 16C in the direction of arrow 17, illustrates how the spot size changes with increasing volume of fluid dispensed, since the fluid is concentrated in the desired location.

Both of the foregoing methods have advantages and disadvantages. Accordingly, what is needed is a method that takes advantage of both the foregoing methods in order to optimize the accuracy and time needed to dispense a fluid in a predetermined area.

Accordingly, an embodiment of the disclosure provides a method for ejecting one or more fluids from an ejection head of a digital dispense device into one or more target areas of a substrate. The method includes:
  a) selecting one or more fixed spot size target areas and total fluid volumes for the one or more fixed spot size target areas of the substrate;
  b) selecting a predetermined droplet volume to be dispensed in the one or more fixed spot size target areas;
  c) calculating a required number of droplets by dividing the total fluid volumes by the predetermined droplet volume to provide the required number of droplets for the one or more fixed spot size target areas;
  d) determining a maximum number of droplets per pixel based on the one or more fixed spot size target areas by dividing the required number of droplets by a total number of droplets allowed in the one or more fixed spot size target areas to provide the maximum volume number of droplets per pixel;

e) calculating a number of droplets per pass of an ejection head over the one or more fixed spot size target areas by dividing the required number of droplets by the maximum number of droplets per pixel;

f) modifying one or more dimension of the one or more fixed spot size target areas to create one or more modified spot size target areas such that the modified spot size target areas are substantially minimized to fit the number of droplets per pass calculated in step (e);

g) selecting and centering the one or more modified spot size target areas in the one or more fixed spot size target areas; and h) depositing one or more fluids in the one or more modified spot size target areas while scanning the ejection head over the one or more modified spot size target areas on the substrate.

In another embodiment, there is provided a mixed dynamic and static method for ejecting one or more fluids from a digital dispense device into a series of predetermined spot size target areas of a substrate. The method includes the steps of:

a) selecting a maximum area for the one or more target areas and total fluid volumes for the one or more target areas;

b) selecting a predetermined droplet volume to be dispensed in the one or more target areas;

c) calculating a required number of droplets by dividing the total fluid volumes by the predetermined droplet volume to provide the required number of droplets for the one or more target areas;

d) determining a maximum number of droplets per pixel for the one or more target areas by dividing the required number of droplets by a total number of droplets allowed in the one or more target areas to provide the maximum number of droplets per pixel;

e) calculating a number of droplets per pass of an ejection head over the one or more target areas by dividing the required number of droplets by the maximum number of droplets per pixel;

f) modifying one or more dimension of the target areas to create one or more modified spot size target areas such that the modified spot size target areas are substantially minimized to fit the number of droplets per pass calculated in step (e);

g) selecting and centering the one or more modified spot size target areas in the one or more fixed spot size target areas;

h) depositing one or more fluids in the one or more modified spot size target areas while scanning the ejection head over the one or more modified spot size target areas on the substrate; and i) if the predetermined droplet volume exceeds the maximum number of droplets per pixel when scanning the ejection head over the one or more modified target areas; terminating the scanning of the ejection head until the predetermined volume of droplets equals the maximum number of droplets per pixel for the one or more modified target areas of the substrate.

In some embodiments, a dimension of the one or more spot size target areas is selected to be held constant and a change to the other unknown dimension of the one or more spot size target areas is then calculated.

In some embodiments, a user can optionally select to use the one or more modified spot size target areas or one or more unmodified spot size target areas.

In some embodiments, the one or more modified spot size target areas are rectangles. In some embodiments, the selected dimension of the one or more modified spot size target areas is a width of the rectangles. In other embodiments, the selected dimension of the one or more modified spot size target areas is a height of the rectangles. In some embodiments the one or more modified spot size target areas are squares.

In some embodiments, the one or more modified spot size target areas are ellipses. In some embodiments, the selected dimension of the one or more modified spot size target areas is a first radius of the ellipses. In other embodiments, the selected dimension of the one or more modified spot size target areas is a second radius of the ellipses. In some embodiments, the one or more modified spot size target areas are circles.

In some embodiments, a minimum area for the one or more target areas of the substrate is selected.

In some embodiments, the one or more modified target areas that require scanning the ejection head over the one or more modified target areas to provide the predetermined volume of droplets are coordinated with one or more modified target areas that require terminating the scanning of the ejection head to provide the predetermined volume of droplets.

In some embodiments, fluid droplets are dispensed at a constant rate over all of the one or more modified target areas of the substrate.

In some embodiments, the fluid droplets are dispensed in one or more modified target areas while scanning the ejection head at the same time as the fluid droplets are dispensed in one or more modified target areas that require terminating the scanning of the ejection head.

In some embodiments, one dimension of the one or more spot size target areas is selected to be held constant and a change to an unknown dimension of the one or more spot size target areas is then calculated by dividing the number of droplets per pass of the ejection head over the one or more modified spot size target areas by the selected dimension of the one or more modified spot size target areas.

In some embodiments, the method further comprises optionally selecting to use the one or more modified spot size target areas or one or more unmodified spot size target areas.

In some embodiments, the required number of droplets calculated in step (c) is rounded to a nearest integer value. In other embodiments, the maximum number of droplets per pixel calculated in step (d) is rounded up to a nearest integer value.

The foregoing methods combine the advantageous aspects of conventional methods to provide a dispense system that utilizes "smart" methods to dispense fluid in one or more predetermined target areas. According to the smart methods described below, a user my select modified target areas and volumes, or may select a method that uses both static and dynamic dispensing of fluid into a series of predetermined spot size target areas. Fluid dispensing then takes place based on the pre-selected dispensing method to automatically fill the target areas with fluid.

BRIEF DESCRIPTION OF THE DRAWINGS

FIG. 5 is an illustration of a substrate having a maximum area for fluid deposit and a modified area for fluid deposit.

DETAILED DESCRIPTION OF EMBODIMENTS OF THE DISCLOSURE

Figure 3:
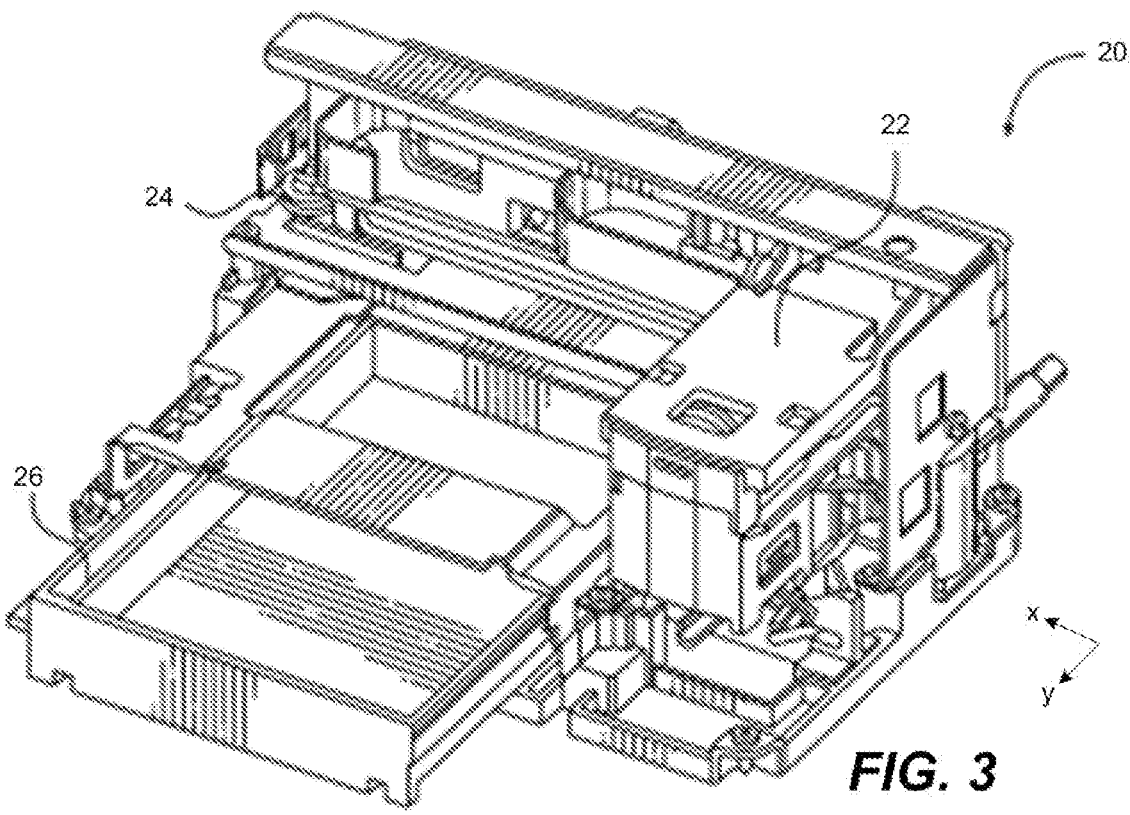
FIG. 3, is a cut-away, perspective view of a digital dispense device for use with the methods of the disclosure.

In contrast to convention inkjet printing devices, the disclosed embodiments provide a unique method for dispensing predetermined amounts of fluid to predetermined target areas using a digital dispensing device. A cut-away view of the digital dispense device 20 is illustrated in FIG. 3 and includes a removable cartridge 22, and a translation device 24 for moving the cartridge in an x direction across a tray 26 holding a target substrate. The cartridge 22 may include a single fluid or multiple fluids and an ejection head for depositing fluids onto a substrate. The cartridge 22 may be removed and a new or different cartridge installed in the digital dispense device 20 for deposition of one or more different fluids onto the substrate.

Figure 4:
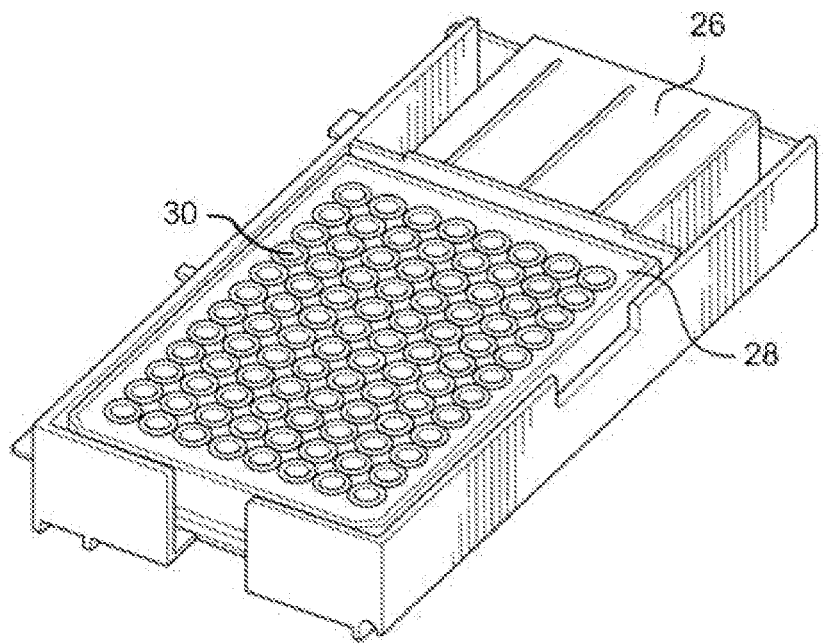
FIG. 4 is a perspective view of a micro well plate on a tray for accepting fluids from the digital dispense device of FIG. 3.

The target substrate may be one or more glass slides or a micro-well plate 28 having a plurality of wells 30 (FIG. 4). For example, when the target substrate is a micro-well plate 28, each well 30 of the micro-well plate 28 may require a different volume of one or more fluids to be dispensed therein. Accordingly, the disclosed embodiments provide efficient methods for dispensing the required amount of fluids onto a substrate such as a micro-well plate 28.

First Method

Figure 1:
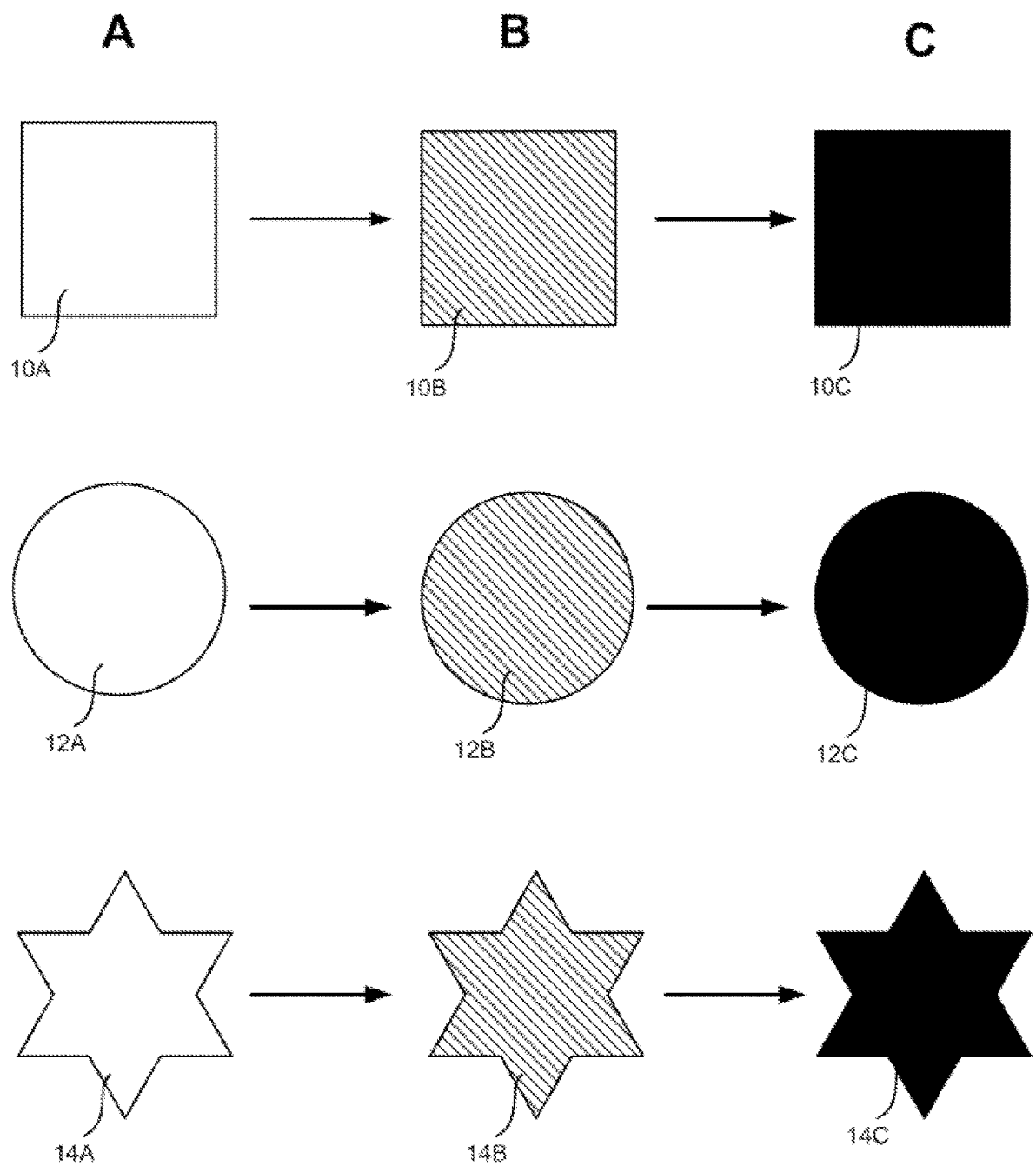
FIG. 1 is a graphic illustration of a prior art method for dispensing fluids.

In a First Method, according to the disclosure, the target area for fluid deposit is not fixed. Thus, calculating a smallest amount of fluid that can be deposited in a specific target area may be advantageous. According to the First Method, the target area may be as small as an area that contains a 1×1 drop of fluid. Optionally, for a rectangular target area, the target area height or width may be optimized while keeping the opposite dimension constant. Thus, the First Method is directed to minimizing the target area while increasing the density of fluid deposited in the target area. By comparison to the prior art method of FIG. 1, for most dispensed volumes, the resulting fluid dispense density is less than 100%, meaning that not every possible X,Y location of the target area has a drop of fluid therein resulting in the partially filled areas 10B, 12B and 14B of FIG. 1.

However, the First Method described herein maximizes the fluid density in an area by reducing or modifying the size of the target areas so that the resulting fluid dispense density in the target areas is close to or equal to 100%. In order to maximize the fluid dispense density in the target areas, the user first selects fixed spot size target areas and fluid volumes for one or more target areas of the substrate or well 30. Next, the user selects a predetermined droplet volume to be dispensed in the fixed spot size target areas. The required number of fluid droplets to be dispensed in the target areas is then determined by dividing the predetermined droplet volume by the fluid volumes for one or more target areas.

Referring to FIG. 5, wherein, each rectangle represents a pixel 32, suppose the maximum fixed spot size target area 34 is a 9×10 rectangle and the minimum fixed spot size target area is a 5×6 rectangle. In this example, the required total volume of droplets for the target area 34 is 480,000 pL. The total volume is then divided by a droplet volume to get a total number of droplets for the target area 34. Assuming the droplet volume per droplet is 100 pL, the total number of droplets would be 4800. Next the maximum number of droplets per pixel 32 is determined by dividing total number of droplets by the fixed spot size target area. In this case, 4800 droplets divided by 90 equals 53.33 droplets per pixel. If the number of droplets per pixel is not a whole integer value, then the number of droplets per pixel is optionally rounded up to the nearest integer value to provide the maximum number of droplets of 54 per pixel per pass of fluid cartridge over the target area 34.

The foregoing method does not guarantee that all jobs will require only one pass of the fluid cartridge 22 containing a fluid ejection head to provide the required droplet volume. Accordingly, higher droplet volumes may still require multiple passes of the ejection head over the target area 34. However, even with higher droplet volumes, the target area 34 may be reduced to the new smaller modified target area 36 if the droplet density in one pass is less than 100% of the maximum number of droplets per pixel. A modified target area is selected by holding one of the dimensions of the modified spot size target area constant, either height or width for a rectangle or radius 1 or radius 2 for an ellipse in order to maximize the density of droplets per pass over the modified targe area 36. The dimension to be held constant is defined as the "known dimension" of the target area. Since only one dimension of the modified target area is known, the other dimension of the modified target area is defined as the "unknown dimension." In this case, the modified target area is selected as a rectangle having a height of 5 pixels and a lower total number of droplets is selected as 2700. Thus, the number of fluid droplets per pass may be determined by dividing the total number of droplets by the maximum number of droplets per pixel to obtain 2700/54=50 droplets per pass. Accordingly, using 50 droplets per pass the other dimension of the modified target area can be determined. So, the width of the modified target area is 50/5=10 pixels. So, the modified target area 36 is a 5 pixel by 10-pixel area. The same is true for selecting the use of a larger number of droplets per pixel. The final step of the First Method is to center the modified target area 36 in the maximum fixed spot size target area 34.

Figure 6A:
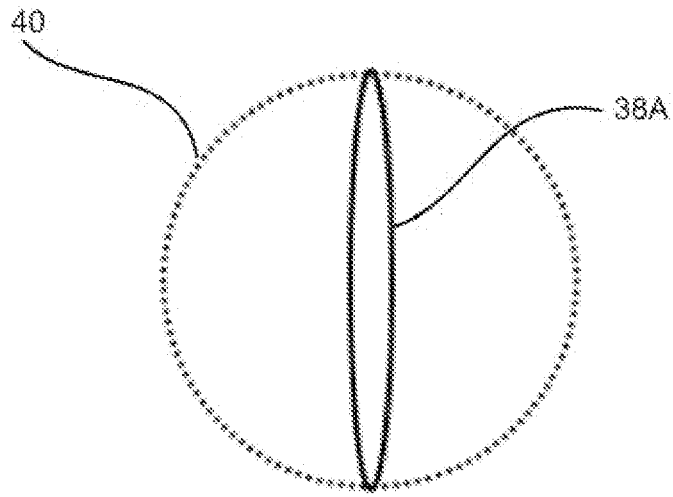
FIG. 6A is a graphic illustration of a First Method of the disclosure for depositing fluids in a modified target area wherein a height of the modified target area is held constant and a width of the modified target area is changed.
Figure 6B:
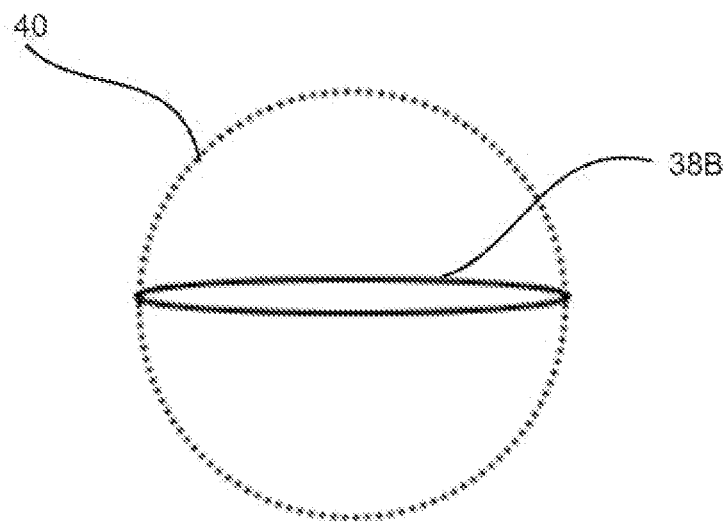
FIG. 6B is a graphic illustration of a First Method of the disclosure for depositing fluids in a modified target area wherein a width of the modified target area is held constant and a height of the modified target area is changed.
Figure 6C:
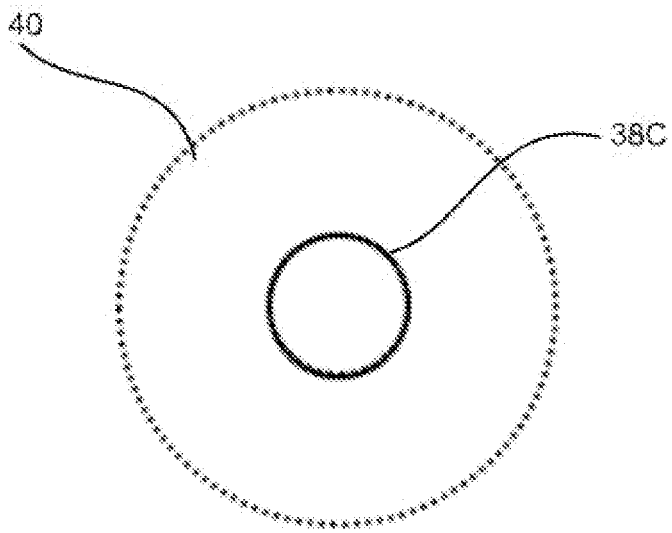
FIG. 6C is a graphic illustration of a First Method of the disclosure for depositing fluids in a modified target area wherein both a height and a width of the modified target area are changed.
Figure 7:
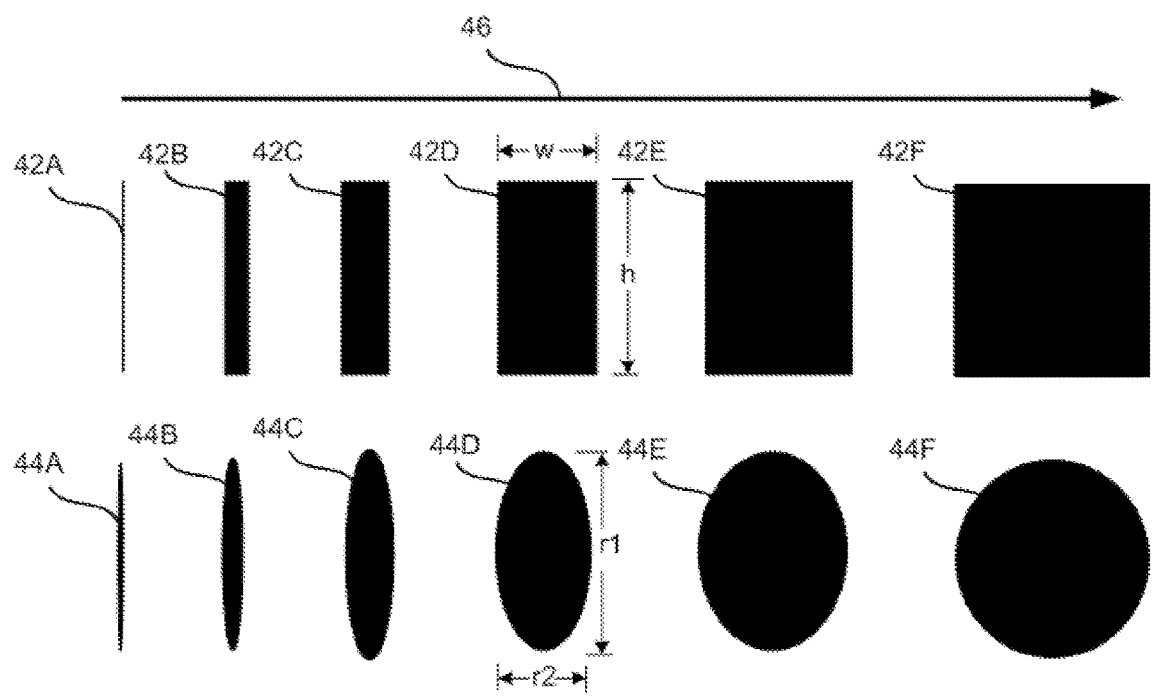
FIG. 7 is a graphic illustration of how modified target areas according to the First Method increase with increasing fluid volumes.
Figure 8:
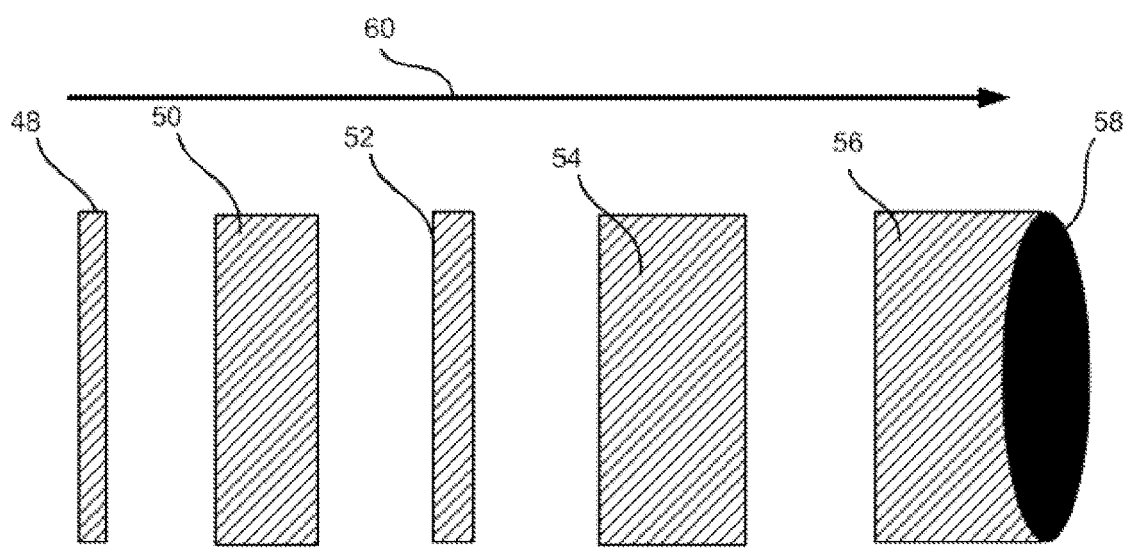
FIG. 8 is a graphic illustration of a Second Method of the disclosure for depositing fluids in modified target areas.

FIGS. 6-8 illustrate how the modified target areas can be used. In each example, each modified target area 38A-38C is centered in the maximum target area 40. In FIG. 6A, the height of the modified target area 38A is held constant and the width of the modified target area is changed depending on the volume of fluid required to be deposited in the modified target area. In FIG. 6B, the width of the modified target area 38B is held constant and the height is changed depending on the volume of fluid required to be deposited in the modified target area. In FIG. 6C, both the height and the width of the modified target area 38C are modified depending on the volume of fluid required to be deposited. By placing the modified target areas 38A-38C in the center of the maximum target area 40, the chance for droplet placement errors that allow droplets to fall outside of the maximum target area 40 is greatly reduced.

When reducing both the width and the height of the modified target area, the most common method would be to make the height and the width the same creating a square modified spot area, or in the case of an ellipse, making radius 1 and radius 2 the same creating a circle modified spot area.

Thus, for a square modified spot area the width (w) is the same as the height (h). Accordingly, the calculations are as follows:

$w*h$=Droplets_per_pass or since w=h,
$w^2$=Droplets_per_pass
w=sqrt(Droplets_per_pass).

For a circle modified spot area, radius 1 (r1) and radius 2 (r2) are the same. Accordingly, the calculations are as follows:

$r1*r2$=Droplets_per_pass/$\pi$ or since r1=r2
$r1^2$=Droplets_per_pass/$\pi$
r1=sqrt(Drops_per_pass/$\pi$).

Ellipses and Rectangles are common spot target shapes; however, the foregoing method may be applied to any common shape if the area can be calculated.

The following specific example may be used to further illustrate the concept:

Maximum spot size: 2.54 mm×2.54 mm square
Print resolution: 600×600 (3600 drops per pass within the 2.54 mm×2.54 mm square)
Drop size: 100 pL
Specified volume in well A-1: 0.36 uL to print is single pass, spot size is 2.54 mm×2.54 mm, 1 drop is deposited in each of the 3600 locations
Specified volume in well A-2: 0.09 uL to print is single pass, spot size area is reduced by a factor of 4 to 0.635 mm×0.635 mm, 1 drop is deposited in each of the 900 locations within the 0.635 mm×0.635 mm square.

FIG. 7 illustrates the concept of the example described above. In this case, as the volume increases, the spot size 42A increases to 42F for a rectangle and increases from 44A to 44F for an ellipse in the direction of arrow 46. By using modified spot sizes as described above, the digital dispense device is able to center and maximize the density of droplets per pass of the ejection head moving in the direction of arrow 46 (x direction in FIG. 3) within the maximum target area. Since the ejection head is constantly moving over the target areas, the First Method may be described as a dynamic method for depositing fluid on a substrate.

Second Method

Figure 2:
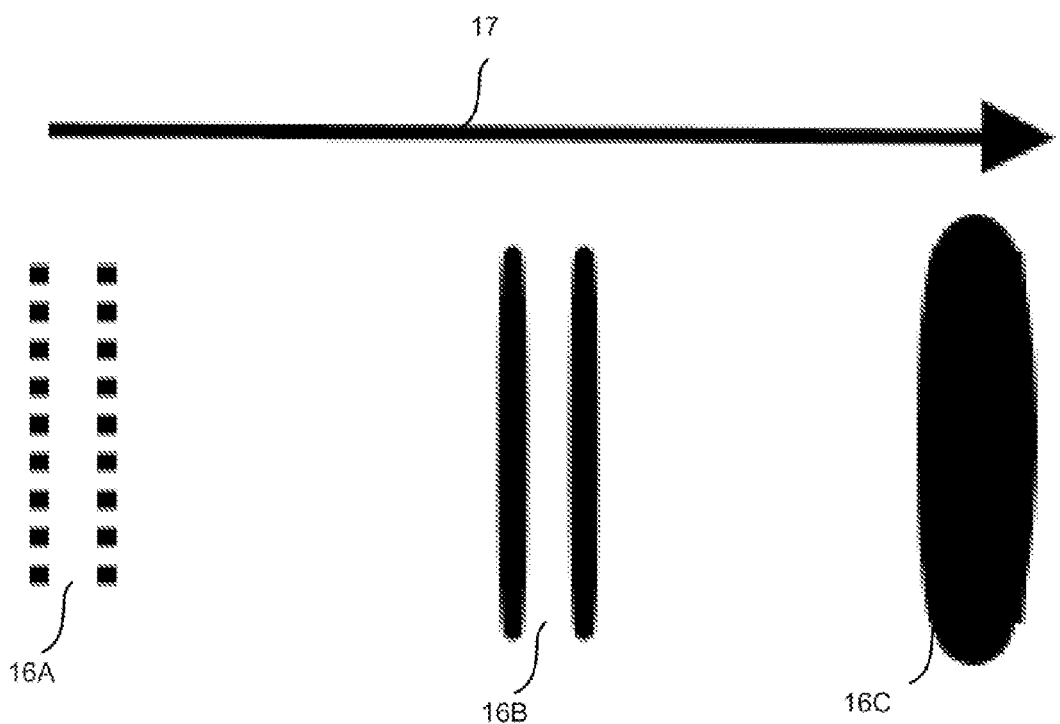
FIG. 2 is a graphic illustration of another prior art method for dispensing fluids.

For some applications, some wells 30 of a micro-well plate 28 may require substantially larger total volumes of fluid than other wells 30 of the micro-well plate 28. Accordingly, for larger total volumes, a static fluid dispensing method, such as described above with reference to FIG. 2, may be used. However, there are tradeoffs between using the dynamic method of the First Method described above, and the static method of FIG. 2. A static fluid dispensing method may be able to dispense a larger total volume of fluid in a target area faster than a dynamic method since the motion for a dynamic method adds time to the fluid dispensing process. However, for a micro-well plate 28 that contains wells 30 that require a total amount of fluid that can be dispensed in one-pass of the ejection head, the First Method described above will be faster due to the acceleration and deceleration of the ejection head during the static fluid dispensing method. There are tradeoffs between using a dynamic fluid dispense method and a static fluid dispense method.

Accordingly, a Second Method for dispensing fluid to a substrate is provided that provides a dynamic fluid dispensing method for fluid dispense volumes below a predetermined total volume level as well as a static fluid dispensing method for fluid dispense volumes above the predetermined total volume level. In the static fluid dispense mode, the motion of the ejection head terminates until the total fluid dispense volume for a particular target area is achieved.

FIG. 8 graphically illustrates the Second Method according to the disclosure. In the Second Method, target areas 48-56 require less fluid than can be dispensed by the First Method of dynamically dispensing fluid, while target area 58 requires more fluid than can be dispensed by the First Method of dynamically dispensing fluid. Accordingly, the ejection head dynamically moves over the target areas 48 to 56 in the direction of arrow 60 until it reaches target area 58 wherein the motion of the ejection head terminates until the total fluid dispense volume for target area 58 is achieved.

In the mixed dynamic and static fluid dispense method of the Second Method, a user selects a maximum area for one or more target areas of the substrate and total fluid volumes for the one or more target areas of the substrate. A minimum area for the one or more target areas may also be selected. A predetermined droplet volume to be dispensed in the one or more target areas is selected. A required number of fluid droplets is calculated by dividing the total fluid volumes by the predetermined droplet volume. In some embodiments, the calculated required number of fluid droplets is rounded to the nearest integer value.

A maximum number of fluid droplets per pixel for the one or more target areas is determined by dividing the required number of droplets by the total number of droplets allowed in the one or more target areas. In some embodiments, the maximum number of droplets per pixel is rounded up to a nearest integer value.

Next, a dimension of one or more modified target areas to be held constant is selected. A modified number of droplet or modified total fluid volume for the one or more modified target areas is also selected. A number of droplets per pass of an ejection head over the one or more modified target areas is calculated by dividing the modified number of droplets by the maximum number of droplets per pixel. If the selected dimension of the one or more modified target areas is different from the unknown dimension, the unknown dimension is determined by dividing the number of droplets per pass of the ejection head over the one or more modified target areas by the selected dimension of the modified target areas.

Next, modified target areas are centered in the one or more target areas. One or more fluids are deposited in the modified target areas while scanning the ejection head over the modified target areas from one end of the substrate to a terminal end of the substrate. If the predetermined droplet number exceeds the maximum number of droplets per pixel when scanning the ejection head over the modified target areas, the scanning of the ejection head is terminated until the predetermined number of droplets equals the maximum number of droplets per pixel for the one or more modified target areas of the substrate.

In some embodiments, the one or more modified target areas that require scanning the ejection head over the one or more modified target areas to provide the predetermined number of droplets are coordinated with one or more modified target areas that require terminating the scanning of the ejection head to provide the predetermined number of droplets. In some embodiments, the fluid droplets are dispensed at a constant rate over all of the one or more modified target areas of the substrate. In some embodiments, the fluid droplets are dispensed in the one or more modified target areas while scanning the ejection head over the substrate while at the same time fluid droplets are dispensed in the one or more target areas that require terminating the scanning of the ejection head over the substrate. In some embodiments, the fluid cartridge is terminated over the center of the target area to allow fluid dispensing to be completed. In some embodiments, fluid is dispensed at a rate while moving the fluid cartridge over the target areas that is the same rate of fluid dispensing when the fluid cartridge is stationary over the target areas. The dispensing of fluid from the fluid cartridge begins based on the position of the fluid cartridge over the substrate and the dispensing of fluid is controlled versus time to provide a consistent behavior during dispensing whether the fluid cartridge is moving or stationary.

Figure 9:
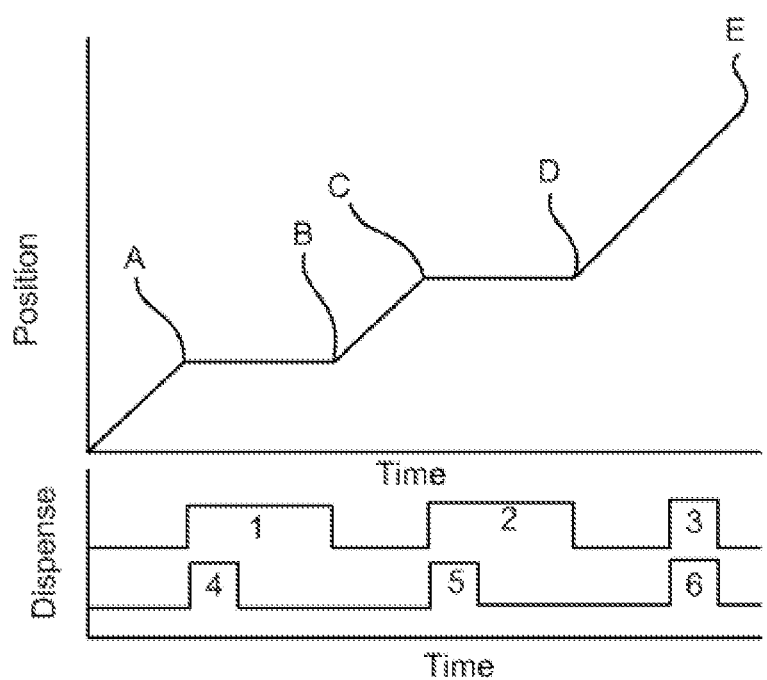
FIGS. 9 and 10 are graphic illustrations of fluid depositing sequences according to the Second Method of the disclosure.
Figure 10:
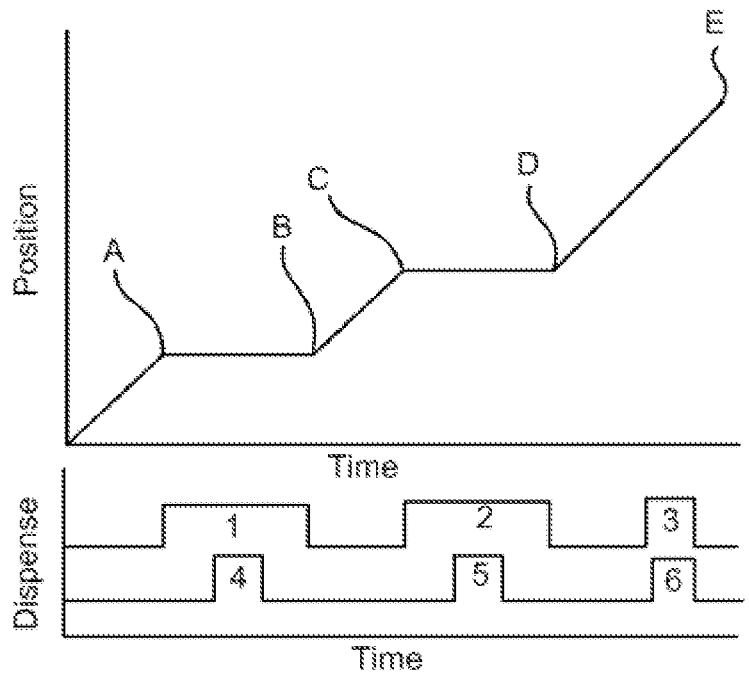

FIGS. 9-10 illustrate the dispensing of fluid versus time for simultaneously dispensing fluids in target areas that require dynamic dispensing with target areas that require static dispensing of fluids. In FIG. 9, target areas 1 and 2 require more fluid than target areas 3, 4, 5, and 6. Accordingly, the fluid cartridge may simultaneously fill target area 4 at the beginning of the time, point A, that target area 1 is being filled. The fluid cartridge will terminate the filling of target area 4 when target area 4 is full and remain stationary while continuing to fill only target area 1 up to point B. At point B, the fluid cartridge continues scanning the substrate while beginning to fill target areas 2 and 5 until target area 5 is filled at which time filling target area 5 is terminated. The fluid cartridge remins stationary from point C to point D until target area 2 is full. The fluid cartridge then continues to scan the substrate while simultaneously filling target areas 3 and 6 with fluid. In the example provided in FIG. 9, the target areas 4, 5 and 6 are filled at the beginning of the time that target areas 1 and 2 are being filled. In FIG. 10, the target areas 4, 5 and 6 are centered in time with the target areas 1, 2 and 3. However, the same process is used regardless of where in time target areas 4, 5 and 6 are filled with respect to target areas 1, 2, and 3.

In both methods described above, the target areas of the substrate and modified target areas of the substrate can take any shape, provided the area of the target areas can be determined. Accordingly, a user may specify any desired shape and the volume per pixel that is dispensed in the specified target areas. Thus, one or more target areas may have different shapes and different numbers of droplets per pixel.

The foregoing methods provides benefits over traditional digital dispense systems which may print the entire volume of fluid into a micro-plate well in a single operation. The foregoing method may be used to spread the volume of fluid to be dispensed over multiple fluid cartridge passes using multiple fluid ejectors along an ejection head array of an ejection head. This will minimize the impact of missing or poorly performing fluid ejectors.

Figure 11:
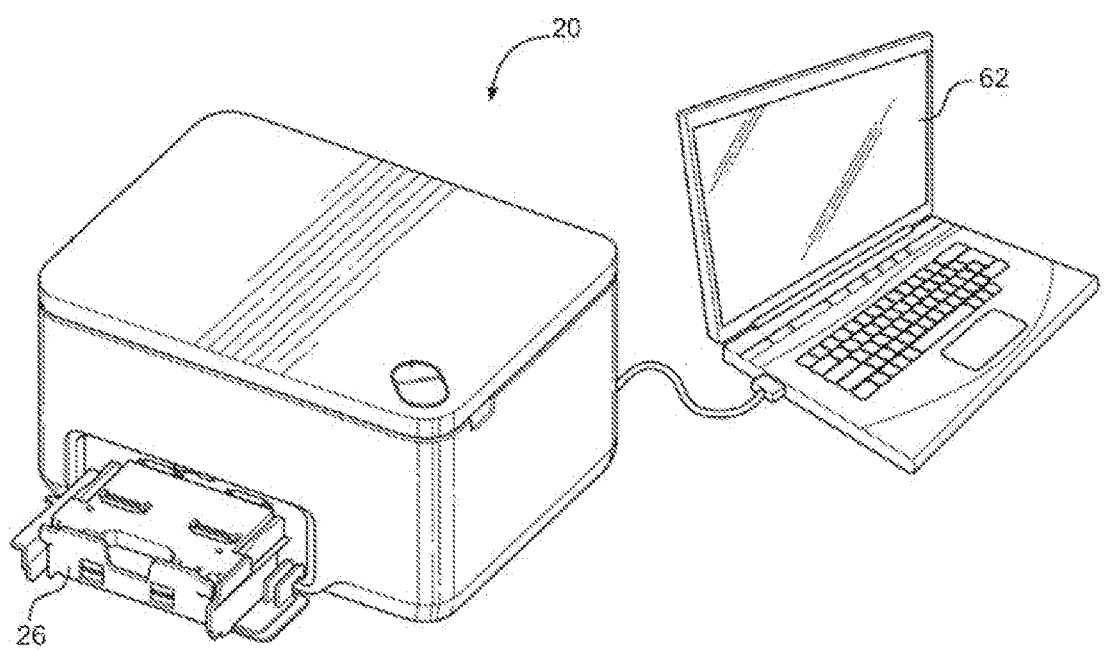
FIG. 11 is a perspective view of the digital dispense device connected to a user input device for depositing fluids on a substrate according to embodiments of the disclosure.

FIG. 11 illustrates the digital dispense system 20 connected to a user input such as a portable computer 62. The user may select either the First Method or the Second Method described above depending on the particular requirements of the fluid dispensing operation. The user input 62 may also be used to specify the maximum and minimum target areas, the volume of fluid to be dispensed in each target areas, the shape of the target areas, and the shape or size of the modified target areas.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method for ejecting one or more fluids from an ejection head of a digital dispense device into one or more target areas of a substrate, the method comprising the steps of:
  a) selecting one or more fixed spot size target areas and total fluid volumes for the one or more fixed spot size target areas of the substrate;
  b) selecting a predetermined droplet volume to be dispensed in the one or more fixed spot size target areas;
  c) calculating a required number of droplets by dividing the total fluid volumes by the predetermined droplet volume to provide the required number of droplets for the one or more fixed spot size target areas;
  d) determining a maximum number of droplets per pixel based on the one or more fixed spot size target areas by dividing the required number of droplets by a total number of droplets allowed in the one one more fixed spot size target areas to provide the maximum number of droplets per pixel;
  e) calculating a number of droplets per pass of an ejection head over the one or more fixed spot size target areas by dividing the required number of droplets by the maximum number of droplets per pixel;

f) modifying one or more dimension of the one or more fixed spot size target areas to create one or more modified spot size target areas such that the modified spot size target areas are substantially minimized to fit the number of droplets per pass calculated in step (e);

g) selecting and centering the one or more modified spot size target areas in the one or more fixed spot size target areas; and h) depositing one or more fluids in the one or more modified spot size target areas while scanning the ejection head over the one or more modified spot size target areas on the substrate.

2. The method of claim 1, wherein the one or more modified spot size target areas are rectangles.

3. The method of claim 2, wherein the selected dimension of the one or more modified spot size target areas is a width of the rectangles.

4. The method of claim 2, wherein the selected dimension of the one or more modified spot size target areas is a height of the rectangles.

5. The method of claim 1, wherein the one or more modified spot size target areas are ellipses.

6. The method of claim 5, wherein the selected dimension of the one or more modified spot size target areas is a first radius of the ellipses.

7. The method of claim 5, wherein the selected dimension of the one or more modified spot size target areas is a second radius of the ellipses.

8. The method of claim 1, wherein the one or more modified spot size target areas are squares.

9. The method of claim 1, wherein the one or more modified spot size target areas are circles.

10. The method of claim 1, wherein one dimension of the one or more spot size target areas is selected to be held constant and a change to an unknown dimension of the one or more spot size target areas is then calculated by dividing the number of droplets per pass of the ejection head over the one or more modified spot size target areas by the selected dimension of the one or more modified spot size target areas.

11. The method of claim 1, wherein the required number of droplets calculated in step (c) is rounded to a nearest integer value.

12. The method of claim 1, wherein the maximum number of droplets per pixel calculated in step (d) is rounded up to a nearest integer value.

13. The method of claim 1, further comprising optionally selecting to use the one or more modified spot size target areas or one or more unmodified spot size target areas.

14. A mixed dynamic and static method for ejecting one or more fluids from a digital dispense device into a series of one or more target areas of a substrate, the method comprising the steps of:

a) selecting a maximum area for the one or more target areas and total fluid volumes for the one or more target areas;

b) selecting a predetermined droplet volume to be dispensed in the one or more target areas;

c) calculating a required number of droplets by dividing the total fluid volumes by the predetermined droplet volume to provide the required number of droplets for the one or more target areas;

d) determining a maximum number of droplets per pixel for the one or more target areas by dividing the required number of droplets by a total number of droplets allowed in the one or more target areas to provide the maximum number of droplets per pixel;

e) calculating a number of droplets per pass of an ejection head over the one or more target areas by dividing the required number of droplets by the maximum number of droplets per pixel;

f) modifying one or more dimension of the target areas to create one or more modified spot size target areas such that the modified spot size target areas are substantially minimized to fit the number of droplets per pass calculated in step (e);

g) selecting and centering the one or more modified spot size target areas in the one or more fixed spot size target areas;

h) depositing one or more fluids in the one or more modified spot size target areas while scanning the ejection head over the one or more modified spot size target areas on the substrate; and i) if the predetermined droplet volume exceeds the maximum number of droplets per pixel when scanning the ejection head over the one or more modified target areas; terminating the scanning of the ejection head until the predetermined volume of droplets equals the maximum number of droplets per pixel for the one or more modified target areas of the substrate.

15. The method of claim 14, further comprising selecting a minimum area for the one or more target areas of the substrate.

16. The method of claim 14, further comprising coordinating the one or more modified target areas that require scanning the ejection head over the one or more modified target areas to provide the predetermined volume of droplets with one or more modified target areas that require terminating the scanning of the ejection head to provide the predetermined volume of droplets.

17. The method of claim 16, wherein the fluid droplets are dispensed at a constant rate over all of the one or more modified target areas of the substrate.

18. The method of claim 16, wherein the fluid droplets are dispensed in one or more modified target areas while scanning the ejection head at the same time as the fluid droplets are dispensed in one or more modified target areas that require terminating the scanning of the ejection head.

19. The method of claim 14, wherein the required number of droplets calculated in step (c) is rounded to a nearest integer value.

20. The method of claim 14, wherein the maximum number of droplets per pixel calculated in step (d) is rounded up to a nearest integer value.

* * * * *